US012731524B2

(12) United States Patent
Calayir et al.

(10) Patent No.: US 12,731,524 B2
(45) Date of Patent: Sep. 8, 2026

(54) REDUCED POWER DISPLAY POWER MANAGEMENT INTEGRATED CIRCUIT

(71) Applicant: Apple Inc., Cupertino, CA (US)

(72) Inventors: Vehbi Calayir, Santa Clara, CA (US); Weimin Zhang, San Jose, CA (US); Bret Rothenberg, Carmel, CA (US); Zhongyuan Ren, Cupertino, CA (US); Fenghua Zheng, San Jose, CA (US); Mohammad Reza Esmaeili Rad, San Jose, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 18/815,162

(22) Filed: Aug. 26, 2024

(65) Prior Publication Data

US 2025/0095540 A1 Mar. 20, 2025

Related U.S. Application Data

(60) Provisional application No. 63/539,274, filed on Sep. 19, 2023.

(51) Int. Cl.
*G09G 3/20* (2006.01)

(52) U.S. Cl.
CPC ......... *G09G 3/2096* (2013.01); *G09G 3/2007* (2013.01); *G09G 2310/027* (2013.01); *G09G 2330/021* (2013.01); *G09G 2330/028* (2013.01)

(58) Field of Classification Search
None
See application file for complete search history.

(56) References Cited

U.S. PATENT DOCUMENTS

| | | | | |
|---|---|---|---|---|
| 11,244,622 | B2 | 2/2022 | Yin | |
| 2022/0198983 | A1 | 6/2022 | Lee et al. | |
| 2022/0223091 | A1* | 7/2022 | Chae | G09G 3/3275 |
| 2023/0015271 | A1* | 1/2023 | Chae | G09G 3/3275 |
| 2023/0089942 | A1 | 3/2023 | Shi et al. | |
| 2023/0387472 | A1* | 11/2023 | Chae | G09G 3/32 |

FOREIGN PATENT DOCUMENTS

| | | | |
|---|---|---|---|
| CN | 106920520 | A | 7/2017 |
| KR | 20200036781 | A | 4/2020 |
| WO | 2022246009 | A1 | 11/2022 |

* cited by examiner

*Primary Examiner* — Kenneth Bukowski
(74) *Attorney, Agent, or Firm* — Fletcher Yoder, P.C.

(57) ABSTRACT

A power management integrated circuit (PMIC) of an electronic display may include image data reference voltage adjustment circuitry, a negative supply voltage generator that may generate a negative supply voltage with multiple negative supply voltages, and/or a dedicated timing controller. The image data reference voltage adjustment circuitry may tune image data reference voltages for generating programming voltages based on receiving an indication of an undesired direct current (DC) voltage offset, an undesired alternating current (AC) noise, or both. The image data reference voltage adjustment circuitry may receive the indication from a display panel of the electronic display. The negative supply voltage generator may elevate a voltage of the negative supply voltage to reduce a power consumption of the electronic display. The dedicated timing controller may improve (e.g., reduce length of) a frequency range of one or more switched voltages of the PMIC to reduce front of screen artifacts.

20 Claims, 12 Drawing Sheets

REDUCED POWER DISPLAY POWER MANAGEMENT INTEGRATED CIRCUIT

CROSS-REFERENCE TO RELATED APPLICATIONS

This application claims priority to U.S. Provisional Application No. 63/539,274, filed Sep. 19, 2023, which is incorporated by reference herein in its entirety for all purposes.

SUMMARY

This disclosure relates to an efficient power management integrated circuit (PMIC) for an electronic display that includes image data reference voltage adjustment circuitry, a dedicated timing controller, and/or implements a power consumption throttle mode.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic device may include various components such as a processor core complex and an electronic display. The electronic display may include a power management integrated circuit (PMIC). In some embodiments, the PMIC may include image data reference voltage adjustment circuitry. The image data reference voltage adjustment circuitry may tune image data reference voltages for generating image data based on receiving an indication of an undesired direct current (DC) voltage offset, an undesired alternating current (AC) noise, or both. The image data reference voltage adjustment circuitry may receive the indication from a display panel of the electronic display.

The PMIC may include a supply voltage generator that may generate a supply voltage with multiple supply voltages. The supply voltage generator may include a positive supply voltage generator generating a positive supply voltage, a negative supply voltage generator generating a negative supply voltage, or both. The supply voltage generator may reduce an absolute voltage value of the supply voltage to reduce a power consumption of the electronic display when operating in a throttle mode. In some cases, the supply voltage generator may elevate a voltage of the supply voltage to reduce a power consumption of the electronic display when operating in the throttle mode. For example, the processor core complex may generate control signals indicative of a throttle mode based on detecting that the stored power of a power source of the electronic device is equal to or below a stored power threshold or a stored electrical charge amount threshold, a power consumption of the electronic device is equal to or above a first power consumption threshold, a power consumption of the electronic display is equal to or above a second power consumption threshold, or a combination thereof.

The electronic display may include a dedicated timing controller dedicated to the PMIC. The dedicated timing controller may be disposed inside or outside the PMIC. In any case, the dedicated timing controller may generate and output one or more clock signals only to one or more components (e.g., switching converters) of the PMIC. The dedicated timing controller may improve (e.g., reduce length of) a frequency range of one or more switched voltages of the PMIC to reduce front of screen artifacts. It should be appreciated in some embodiments, the electronic display may include the image data reference voltage adjustment circuitry, the supply voltage generator(s) that may generate a supply voltage with multiple supply voltages, the dedicated timing controller dedicated to the PMIC, or any combination thereof.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
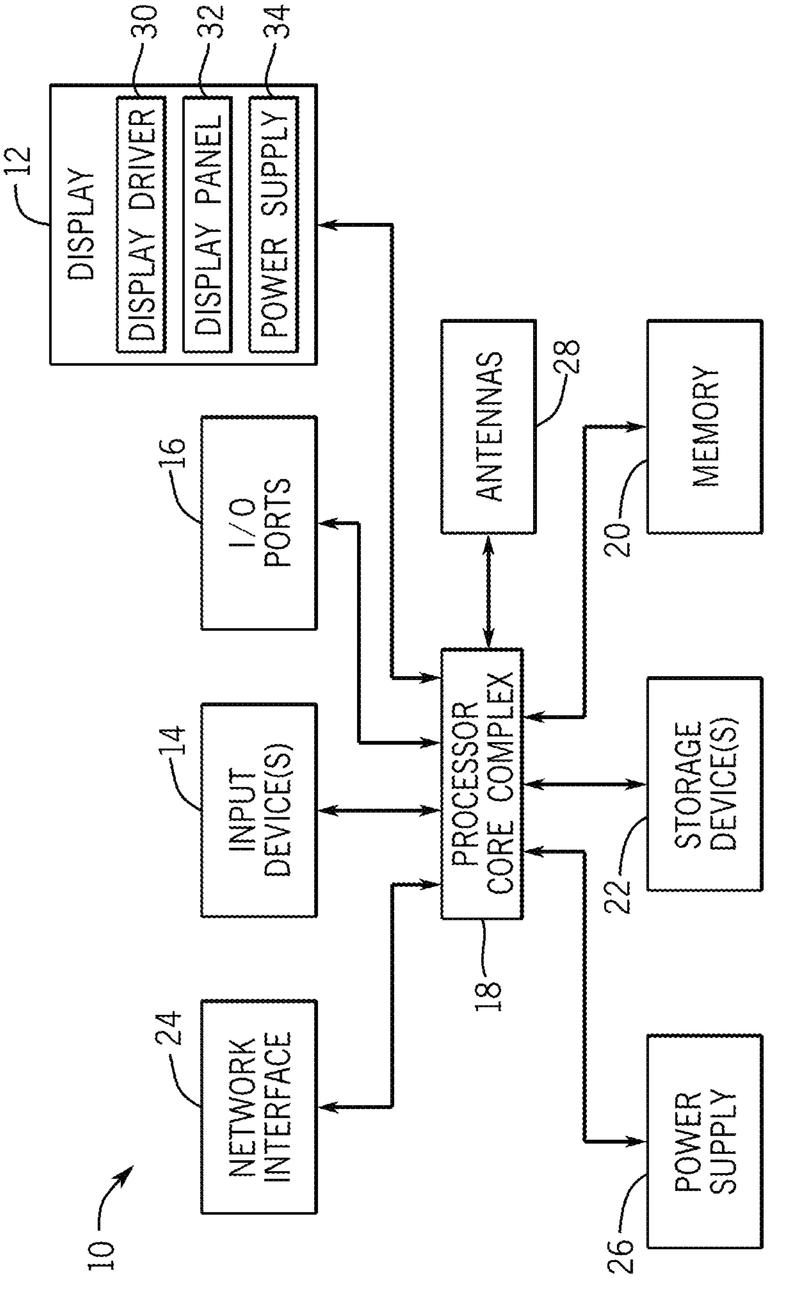
FIG. 1 is a block diagram of an electronic device with an electronic display, according to embodiments of the present disclosure.

An electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and one or more antennas 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 and/or the main memory storage device 22 to perform operations, such as generating or transmitting image data to display on the electronic display 12. As such, the processor core complex 18 may include one or more processor, one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power (or power) to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

The electronic display 12 may control light emission of the display pixels based on receiving the supply voltages. The electronic display 12 may control light emission of the display pixels to provide visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on image data associated with corresponding display pixels in the image. In some embodiments, image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on image data generated by the processor core complex 18, or the electronic display 12 may display frames based on image data received via the network interface 24, an input device, or an I/O port 16.

Figure 2:
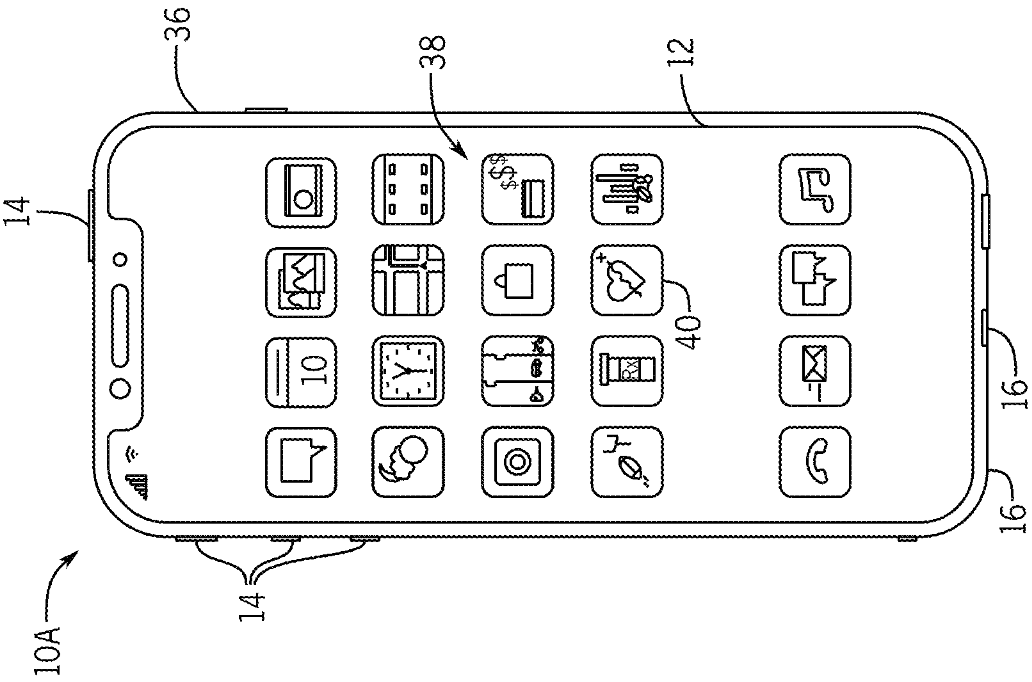
FIG. 2 is a front view of a handheld device representing an example of the electronic device of FIG. 1, according to embodiments of the present disclosure.

The electronic device 10 may also have the one or more antennas 28 electrically coupled to the processor core complex 18. The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 36 (e.g., housing). The enclosure 36 may protect interior components from physical damage or shield them from electromagnetic interference, such as by surrounding the electronic display 12. The electronic display 12 may display a graphical user interface (GUI) 38 having an array of icons. When an icon 40 is selected either by an input device 14 or a touch-sensing component of the electronic display 12, an application program may launch.

The input devices 14 may be accessed through openings in the enclosure 36. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
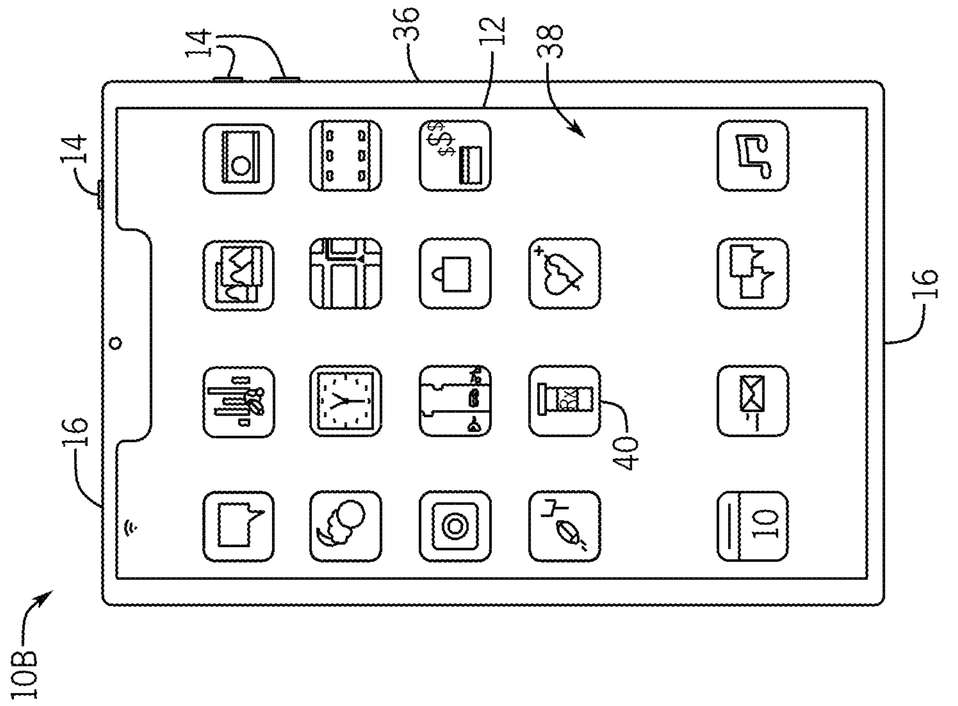
FIG. 3 is a front view of another handheld device representing another example of the electronic device of FIG. 1, according to embodiments of the present disclosure.
Figure 4:
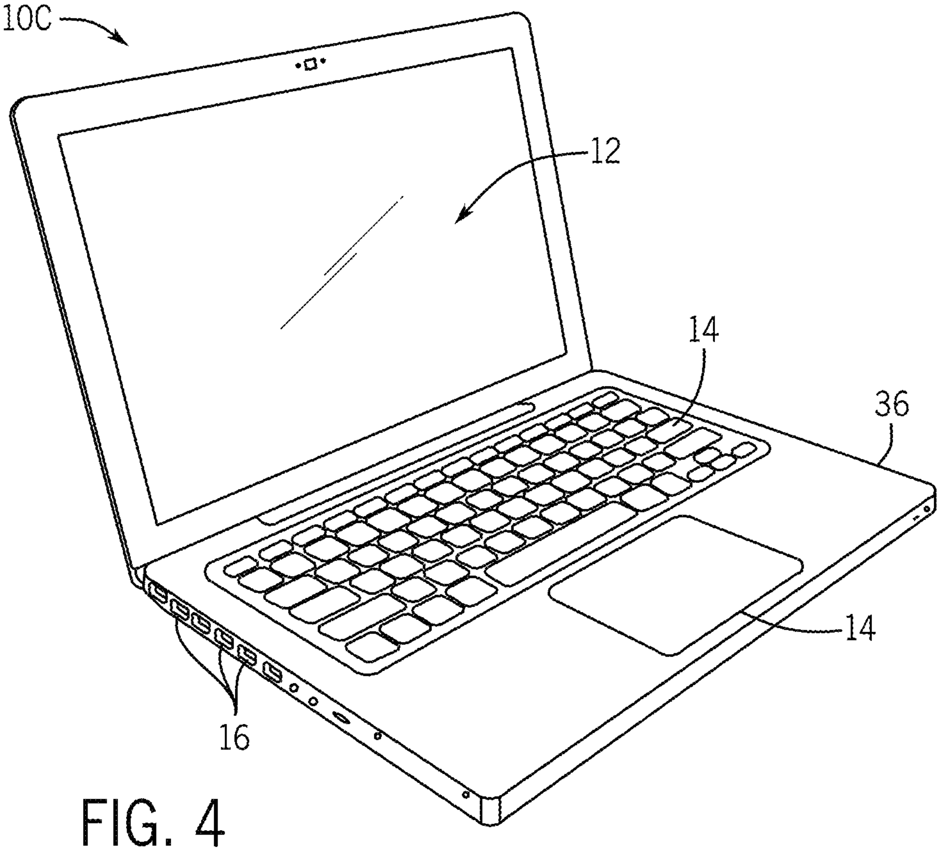
FIG. 4 is a perspective view of a notebook computer representing an example of the electronic device of FIG. 1, according to embodiments of the present disclosure.
Figure 5:
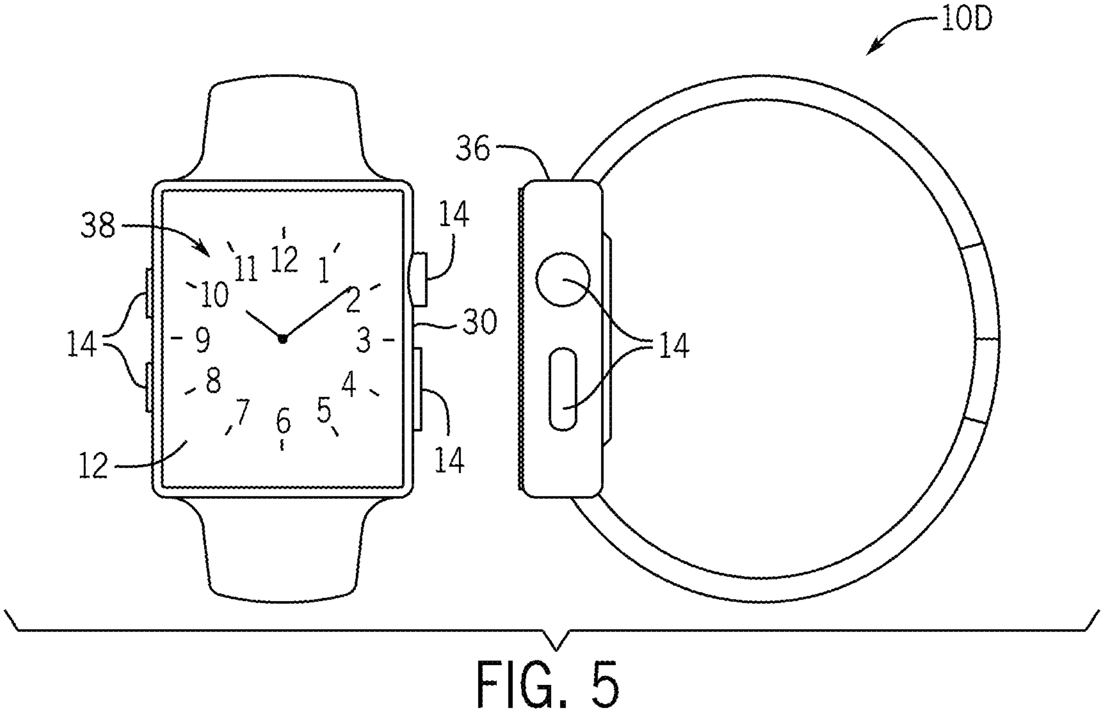
FIG. 5 illustrates front and side views of a wearable electronic device representing another example of the electronic device of FIG. 1, according to embodiments of the present disclosure.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc.

As depicted, the tablet device 10B, the computer 10C, and the watch 10D each also includes an electronic display 12, input devices 14, I/O ports 16, and an enclosure 36. The electronic display 12 may display a GUI 38. Here, the GUI 38 shows a visualization of a clock. When the visualization is selected either by the input device 14 or a touch-sensing component of the electronic display 12, an application program may launch, such as to transition the GUI 38 to presenting the icons 40 discussed with respect to FIGS. 2 and 3.

Figure 6:
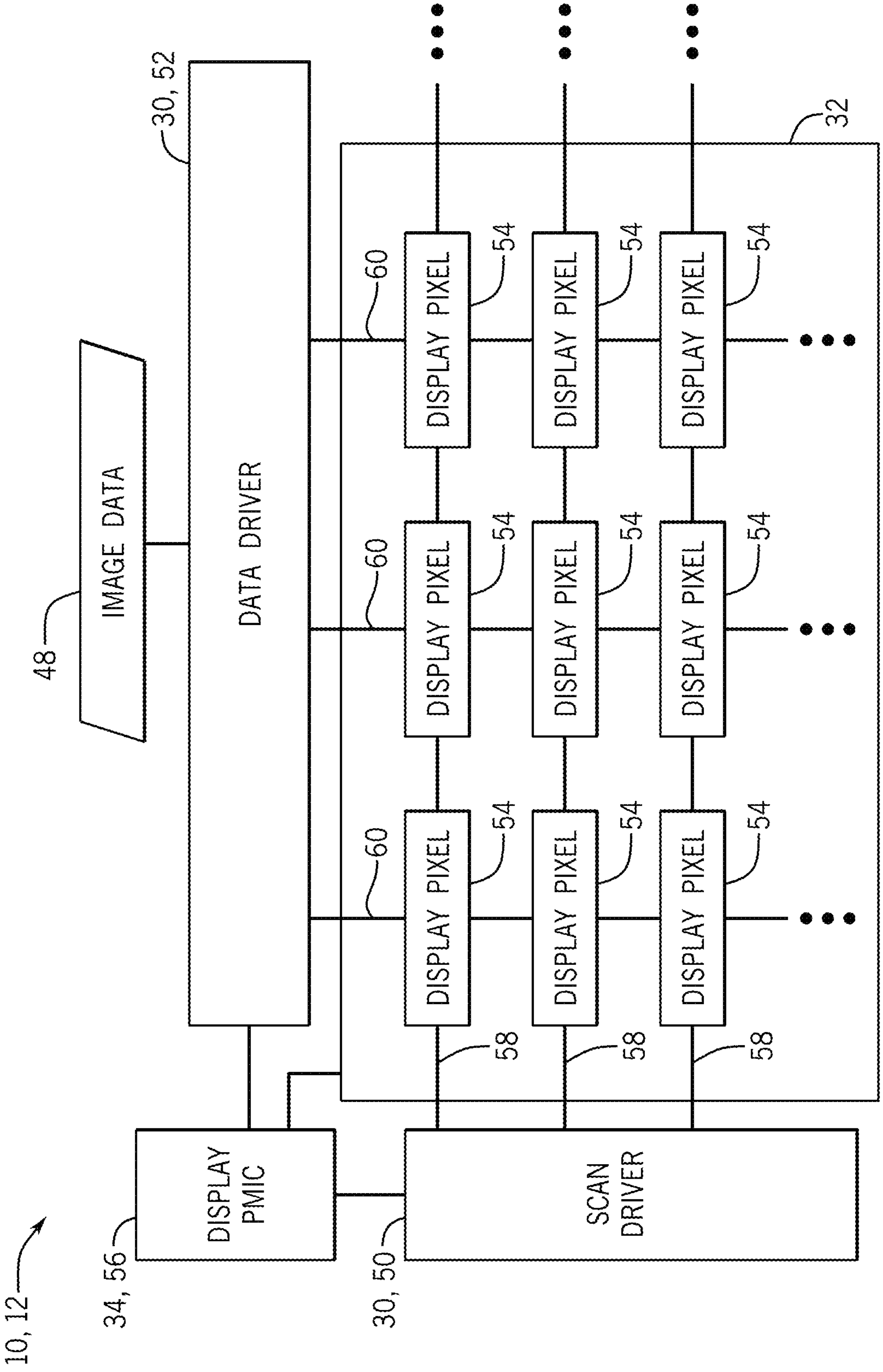
FIG. 6 is a block diagram of display driver circuitry and display panel of the electronic devices of FIGS. 1-5, according to embodiments of the present disclosure.

In FIG. 6, pixel circuitry of the display panel 32 associated with the electronic display 12 of the electronic device 10 is shown as an electronic display 12. The electronic display 12 may represent a liquid crystal display (LCD) or an organic light emitting diode (OLED) display. The electronic display 12 may receive image data 48 for display. The electronic display 12 uses the driver circuitry 30 that includes scan driver 50 and data driver 52 to program the image data 48 onto display pixels 54. The image data 48 may indicate a gray level (e.g., G0-G255) for light emission by one or more of the display pixels 54. For example, the data driver 52 may generate and output programming voltages to the display pixels 54 based on the image data 48. The display panel 32 may include the display pixels 54 disposed hereon.

The electronic display 12 uses a power management integrated circuit (PMIC) 56 of the power supply circuitry 34 to generate supply voltages and image data reference voltages. In some embodiments, the PMIC 56 may include a dedicated timing controller (TCON) outputting dedicated clock signals for generating the supply voltages and the image data reference voltages. The image data reference voltages may include a high image data reference voltage (e.g., a maximum image data voltage) corresponding to light emission associated with a gray level. In some embodiments, the gray level of the high image data may correspond to a high gray level (e.g., white color, G245-G255, G255, among other possibilities). In alternative or additional embodiments, the gray level of the high image data may correspond to a low gray level (e.g., black color, G0, G0-G10, among other possibilities).

The image data reference voltages may include a low image data reference voltage (e.g., a minimum image data voltage) corresponding to light emission associated with a gray level different (e.g., opposite, nearly opposite) from the gray level of the high image data. In some embodiments, the gray level of the low image data may correspond to a low gray level (e.g., black color, G0, G0-G10, among other possibilities). In alternative or additional embodiments, the gray level of the low image data may correspond to a high gray level (e.g., white color, G245-G255, G255, among other possibilities).

The PMIC 56 may output the supply voltages and the image data reference voltages to the scan driver 50, the data driver 52, and/or the display pixels 54. In some embodiments, the PMIC 56 may output adjusted image data reference voltages in lieu of or in addition to outputting the image data reference voltages. The adjusted image data reference voltages may be tuned to compensate for at least a portion of undesired direct current (DC) voltage offset and/or AC noise of the supply voltages at one or more of the display pixels 54, as will be appreciated.

The data driver 52 may generate the programming voltages based on the image data 48 and as adjusted by the image data reference voltages and/or the adjusted image data reference voltages, to the display pixels 54 via the data lines 60. For example, the data driver 52 may generate the programming voltages based on the high image data reference voltage (e.g., the maximum image data voltage) and the low image data reference voltage (e.g., the minimum image data voltage). Moreover, the scan driver 50 may generate and/or provide scan signals (e.g., pixel reset, data enable, on-bias stress) on scan lines 58 to control the display pixels 54 by row. For example, the scan driver 50 may cause one or more selected rows of the display pixels 54 to become enabled to receive a portion of the programming voltages from the data lines 60 from the data driver 52. In this way, an image frame of image data 48 may be programmed onto the display pixels 54 row by row or selected groups of rows.

The display pixels 54 may each have a liquid crystal (LC) cell to filter certain colors of light in various brightness levels from a backlight (not shown) or may contain one or more self-emissive elements, such as a light-emitting diodes (LEDs) (e.g., organic light emitting diodes (OLEDs) or micro-LEDs (p LEDs)). The display pixels 54 may also represent pixels of digital mirror devices (DMD) or other suitable display devices that may use pixel grouping. In any event, different display pixels 54 may emit different colors (e.g., red, green, blue (RGB)). For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to other color combinations, such as combinations that use cyan, magenta, and yellow (CMY), or others.

Figure 7:
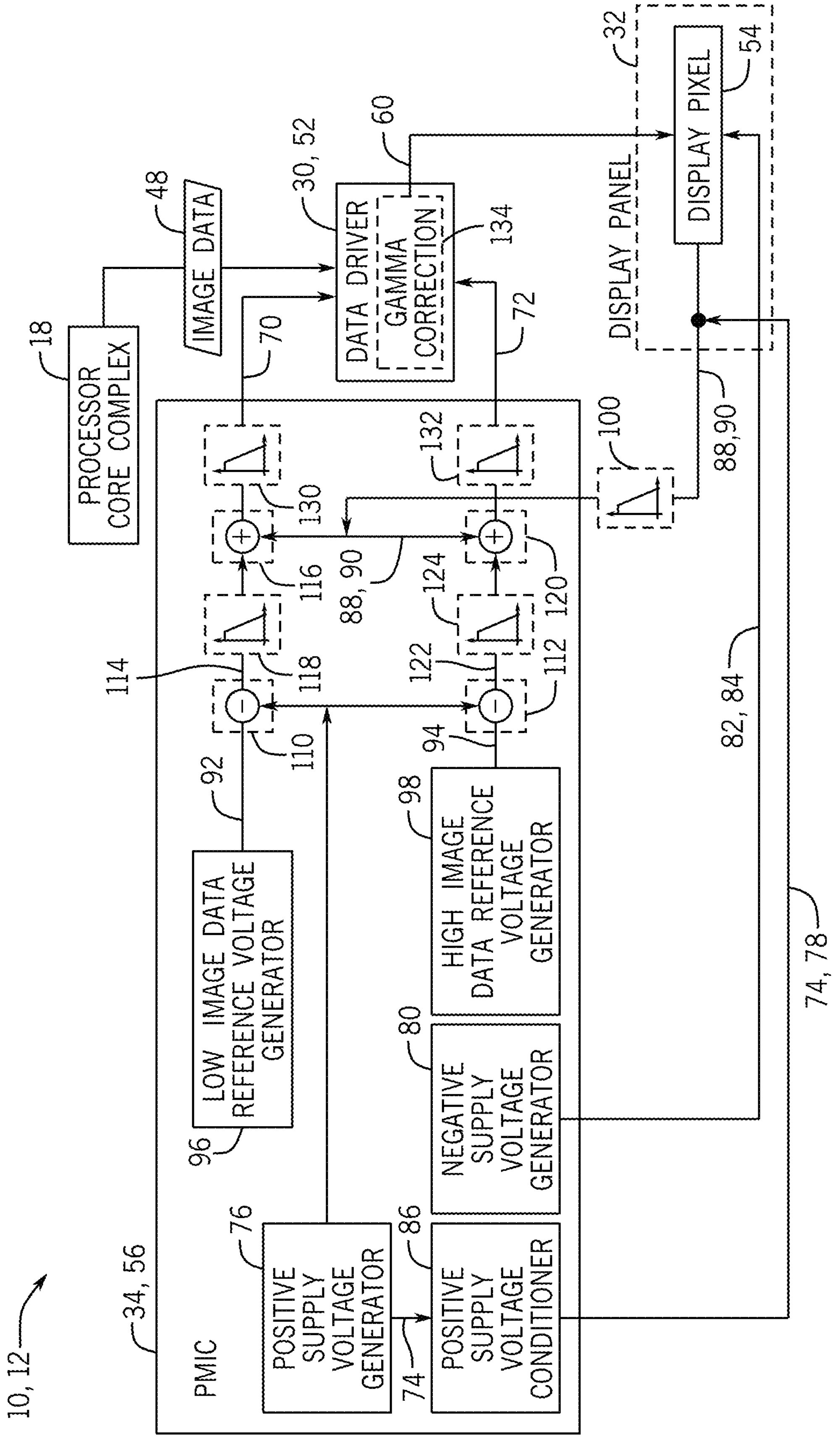
FIG. 7 is a block diagram of a portion of the electronic display of FIG. 6 including at least a portion of a Power Management Integrated Circuit (PMIC), at least a portion of a data driver, and a display pixel, according to embodiments of the present disclosure.

FIG. 7 is a block diagram of a portion of the electronic display 12 including at least a portion of the PMIC 56, at least a portion of the data driver 52, and a display pixel 54, according to embodiments of the present disclosure. The display pixel 54 may correspond to any one or more display pixels 54 of the display panel 32 discussed above. In the depicted embodiment, the processor core complex 18 of the electronic device 10 may output the image data 48 to the data driver 52. In alternative or additional embodiments, the image data 48 may be received from another electronic device 10, for example, via the network interface 24, the input devices 14, and/or the I/O port 16 of the electronic device 10 discussed above. The data driver 52 may generate and output programming voltages based on the image data 48 to the display pixel 54 for emitting light with a desired gray level.

In some embodiments, the data driver 52 may generate the programming voltages based on the image data 48, and as adjusted based on adjusted image data reference voltages 70 and 72, to the display pixel 54. The PMIC 56 may generate the adjusted image data reference voltages 70 and 72, hereinafter referred to as the adjusted reference voltages 70 and 72, to compensate for at least a portion of undesired DC voltage offset and/or AC noise of a positive supply voltage 74 at the display pixel 54. Moreover, the PMIC 56 may output the adjusted reference voltages 70 and 72 to the data driver 52 for generating the programming voltage. Accordingly, in some cases, the display pixel 54 may emit light with a gray scale more closely corresponding to the desired gray scale of the image data 48 based on generating the programming voltages, as adjusted by the adjusted reference voltages 70 and 72, as will be appreciated.

The PMIC 56 may include a positive supply voltage generator 76 to generate the positive supply voltage 74 (e.g., electroluminescence positive voltage (ELVDD)). The positive supply voltage generator 76 may output the positive supply voltage 74 to the display pixel 54 via a positive supply voltage path 78. Moreover, the PMIC 56 may include a negative supply voltage generator 80. The negative supply voltage generator 80 may generate a negative supply voltage 82 (e.g., electroluminescence negative voltage (ELVSS)). The negative supply voltage generator 80 may output the negative supply voltage 82 to the display pixel 54 via a negative supply voltage path 84.

In the depicted embodiment, the PMIC 56 includes a positive supply voltage conditioner 86. In some embodiments, the positive supply voltage conditioner 86 may include a buffer circuit, a DC-DC converter circuit, and/or filtering circuitry, among other things, to condition the positive supply voltage 74 for transmission to the display pixel 54. As such, the positive supply voltage generator 76 may output the positive supply voltage 74, as conditioned, to the display pixel 54 via the positive supply voltage conditioner 86. In alternative or additional embodiments, the positive supply voltage generator 76 may output the positive supply voltage 74 directly to the display pixel 54. For example, the PMIC 56 may omit the positive supply voltage conditioner 86.

In different embodiments, the positive supply voltage 74 and/or the negative supply voltage 82 may have different voltage values. For example, the positive supply voltage 74 and/or the negative supply voltage 82 may each have a positive voltage value, a negative voltage value, a zero or near zero voltage value, or a voltage value of a ground terminal of the electronic display 12. In some cases, the voltage value of the positive supply voltage 74 may be higher than the voltage value of the negative supply voltage 82.

The positive supply voltage path 78 and/or the negative supply voltage path 84 may each include a trace and/or a power supply plane. Moreover, in some embodiments, the data driver 52 and/or the scan driver 50 (shown in FIG. 6) of the electronic display 12 may include a portion of the negative supply voltage path 84 and/or the positive supply voltage path 78.

In any case, the display pixel 54 may emit light based on receiving the negative supply voltage 82, the positive supply voltage 74, and the programming voltages. For example, the display pixel 54 may include a switch, such as a transistor and/or a thin-film transistor (TFT), and a self-emissive element. The switch may conduct an amount of current to the self-emissive element based on a voltage difference between the positive supply voltage 74 and the negative supply voltage 82 and based on voltage values of the programming voltages.

In some cases, the positive supply voltage 74 may include the undesired DC voltage offset and/or AC noise at or near the display pixel 54. For example, the positive supply voltage path 78, the positive supply voltage conditioner 86, the data driver 52, and/or the scan driver 50, among other things, may generate a portion of the undesired DC voltage offset and/or AC noise. In the depicted embodiment, the electronic display 12 includes a feedback path 88 to provide (e.g., return) the positive supply voltage 74, as sensed at or near the display pixel 54, to the PMIC 56.

In particular, the feedback path 88 may provide a sensed positive supply voltage 90 of the display pixel 54 to the PMIC 56. In some cases, the sensed positive supply voltage 90 may include the positive supply voltage 74, the undesired DC voltage offset, and/or AC noise. The PMIC 56 may adjust a voltage value of image data reference voltages 92 and 94 based on the sensed positive supply voltage 90. As such, the PMIC 56 may compensate for at least a portion of the undesired DC voltage offset and/or AC noise of the positive supply voltage 74 at the display pixel 54, as will be appreciated.

The PMIC 56 may include a low image data reference voltage generator 96 and a high image data reference voltage generator 98. Hereinafter, the low image data reference voltage generator 96 may be referred to as the low voltage generator 96 and the high image data reference voltage generator 98 may be referred to as the high voltage generator 98. Moreover, the low voltage generator 96 may generate a low image data reference voltage 92, hereinafter referred to as the low reference voltage 92. Furthermore, the high voltage generator 98 may generate a high image data reference voltage 94, hereinafter referred to as the high reference voltage 94.

The low voltage generator 96 may be coupled to a first subtractor circuit 110. The low voltage generator 96 may output the low reference voltage 92 to the first subtractor circuit 110. The high voltage generator 98 may be coupled to a second subtractor circuit 112. The high voltage generator 98 may output the high reference voltage 94 to the second subtractor circuit 112. Moreover, the positive supply voltage generator 76 may be coupled to the first subtractor circuit 110 and the second subtractor circuit 112. The positive supply voltage generator 76 may output the positive supply voltage 74 to the first subtractor circuit 110 and the second subtractor circuit 112.

The first subtractor circuit 110 may generate a low delta reference voltage 114 by subtracting the positive supply voltage and (e.g., from) the low reference voltage 92. Moreover, the first subtractor circuit 110 may be coupled to a first adder circuit 116. The first subtractor circuit 110 may output the low delta reference voltage 114 to the first adder circuit 116.

In the depicted embodiment, the first subtractor circuit 110 may be coupled to the first adder circuit 116 via a first filter 118. That is, the PMIC 56 may include the first filter 118 coupled to the first subtractor circuit 110 and the first adder circuit 116. In some cases, the first filter 118 may include circuitry to reduce a voltage value of signals with frequencies higher than a frequency threshold (e.g., 1 Hertz (Hz), 3 Hz, 14 Hz, 100 Hz, and so on). For example, the first filter 118 may include a low-pass filter.

Moreover, the second subtractor circuit 112 may generate a high delta reference voltage 122 by subtracting the positive supply voltage 74 and (e.g., from) the high reference voltage 94. Moreover, the second subtractor circuit 112 may be coupled to a second adder circuit 120. The second subtractor circuit 112 may output the high delta reference voltage 122 to the second adder circuit 120.

In the depicted embodiment, the second subtractor circuit 112 may be coupled to the second adder circuit 120 via a second filter 124. That is, the PMIC 56 may include the second filter 124 coupled to the second subtractor circuit 112 and the second adder circuit 120. In some cases, the second filter 124 may include circuitry to reduce a voltage value of signals with frequencies higher than a frequency threshold (e.g., 1 Hz, 3 Hz, 14 Hz, 100 Hz, and so on). For example, the second filter 124 may include a low-pass filter.

It should be appreciated that in specific embodiments, the PMIC 56 may not include (e.g., omit) the first filter 118 and/or the second filter 124. In different embodiments, the first filter 118 and/or the second filter 124 may each include different circuitry such as resistors, programmable resistors, and/or capacitors, among other things. In some embodiments, the first filter 118 and/or the second filter 124 may be programmable, for example, based on including one or more programmable resistor, among other things. For example, the processor core complex 18, or any other viable circuitry, may provide control signals to bypass the first filter 118 and/or the second filter 124 or adjust a pass-through bandwidth of the first filter 118 and/or the second filter 124 for different operations of the electronic device 10.

Moreover, the first subtractor circuit 110, the second subtractor circuit 112, the first adder circuit 116, and the second adder circuit 120 may each include any suitable circuitry. For example, in different embodiments, the first subtractor circuit 110, the second subtractor circuit 112, the first adder circuit 116, and the second adder circuit 120 may each include various routing paths, one or more differential amplifiers, inverter circuitry, adder circuitry, or a combination thereof, among other things.

With the foregoing in mind, the feedback path 88 may also be coupled to the first adder circuit 116 and the second adder circuit 120. The feedback path 88 may provide the sensed positive supply voltage 90 to the first adder circuit 116 and the second adder circuit 120. In some cases, the feedback path 88 may include a filter 100 to reduce a voltage value of signals with frequencies higher than and/or lower than a frequency threshold (e.g., 1 Hz, 3 Hz, 14 Hz, 100 Hz, and so on). For example, the filter 100 may include a low-pass filter, high-pass filter, or band-pass filter. The first adder circuit 116 may generate the adjusted low voltage 70 (or the adjusted low image data reference voltage 70) by adding (e.g., combining) the low delta reference voltage 114 and the sensed positive supply voltage 90. Moreover, in some cases, the second adder circuit 120 may generate an adjusted high voltage 72 (or an adjusted high image data reference voltage 72) by adding (e.g., combining) the high delta reference voltage 122 and the sensed positive supply voltage 90.

As discussed above, in some cases, the sensed positive supply voltage 90 may include the positive supply voltage 74 and the undesired DC voltage offset and/or AC noise at the display pixel 54. As such, in some cases, the adjusted low voltage 70 may include the low reference voltage 92 and the undesired DC voltage offset and/or AC noise at the display pixel 54. Similarly, in some cases, the adjusted high voltage 72 may include the high reference voltage 94 and the undesired DC voltage offset and/or AC noise at the display pixel 54.

The first adder circuit 116 and the second adder circuit 120 may be coupled to the data driver 52. The first adder circuit 116 and the second adder circuit 120 of the PMIC 56 may output the adjusted low voltage 70 and the adjusted high voltage 72, respectively, to the data driver 52. The data driver 52 may include circuitry to generate the programming voltages based on the image data 48, the adjusted low voltage 70, and the adjusted high voltage 72. In some cases, the adjusted low voltage 70 and the adjusted high voltage 72 may be aligned with or otherwise reflect the undesired DC voltage offset and/or AC noise. In specific cases, the adjusted low voltage 70 and the adjusted high voltage 72 may be proportional, inversely proportional, and/or scaled at various proportions with respect to the DC voltage offset and/or AC noise. In alternative or additional cases, the adjusted low voltage 70 and the adjusted high voltage 72 may not exhibit a proportional alignment with the undesired DC voltage offset and/or AC noise.

In the depicted embodiment, the first adder circuit 116 may be coupled to the data driver 52 via a third filter 130. That is, the PMIC 56 may include the third filter 130 coupled to the first adder circuit 116 and the data driver 52. Moreover, the second adder circuit 120 may be coupled to the data driver 52 via a fourth filter 132. That is, the PMIC 56 may include the fourth filter 132 coupled to the second adder circuit 120 and the data driver 52. In some cases, the third filter 130 and the fourth filter 132 may each include circuitry to reduce a voltage value of signals with frequencies higher than a frequency threshold (e.g., 1 Hz, 3 Hz, 14 Hz, 100 Hz, and so on). For example, the third filter 130 and the fourth filter 132 may each include a low-pass filter.

It should be appreciated that in specific embodiments, the PMIC 56 may not include (e.g., omit) the third filter 130 and/or the fourth filter 132. In specific embodiments, the third filter 130 and/or the fourth filter 132, or a portions of the third filter 130 and/or the fourth filter 132, may be disposed outside of the PMIC 56. For example, a programmable resistor and/or a capacitor of the third filter 130 and/or the fourth filter 132 may be disposed outside of the PMIC 56. In different embodiments, the third filter 130 and/or the fourth filter 132 may each include different circuitry such as resistors, programmable resistors, and/or capacitors, among other things. In some embodiments, the third filter 130 and/or the fourth filter 132 may be programmable, for example, based on including one or more programmable resistor, among other things. For example, the processor core complex 18, or any other viable circuitry, may provide control signals to bypass the third filter 130 and/or the fourth filter 132 or adjust a pass-through bandwidth of the first filter 118 and/or the second filter 124 for different operations of the electronic device 10.

The data driver 52 may include gamma correction circuitry 134 to generate gamma reference voltages for driving the image data 48. In the depicted embodiment, the gamma correction circuitry 134 may generate the gamma reference voltages based on the adjusted low voltage 70 and the adjusted high voltage 72. As discussed above, in some cases, the adjusted low voltage 70 and the adjusted high voltage 72 may include the undesired DC voltage offset and/or AC noise at the display pixel 54.

In such cases, the gamma correction circuitry 134 may generate the gamma reference voltages to account for the undesired DC voltage offset and/or AC noise at the display pixel 54. As such, the gamma correction circuitry 134 and/or the data driver 52 may tune or adjust voltage values of the programming voltages based on the image data, the adjusted low voltage 70, and the adjusted high voltage 72 to compensate for the undesired DC voltage offset and/or AC noise at the display pixel 54. For example, the gamma correction circuitry 134 may provide a positive or negative DC voltage value offset to the programming voltages based on an undesired negative or positive DC voltage value offset of the positive supply voltage 74 at the display pixel 54.

The data driver 52 may output the programming voltages as adjusted or tuned by the gamma correction circuitry 134 based on the image data 48, the adjusted reference voltages 70 and 72, to the display pixel 54 of the display panel 32. Accordingly, the display pixel 54 may emit light with a desired gray scale associated with the image data 48. In particular, the display pixel 54 may emit light more closely corresponding to the desired gray scale of the image data 48 based on receiving the programming voltages based on the image data 48 and as adjusted based on the adjusted reference voltages 70 and 72, to compensate for the undesired DC voltage offset and/or AC noise at the display pixel 54. In some cases, the display pixel 54 may emit light with reduced front of screen artifacts based on receiving the programming voltages based on the image data 48 and as adjusted based on the adjusted reference voltages 70 and 72, to compensate for the undesired DC voltage offset and/or AC noise at the display pixel 54.

Figure 8:
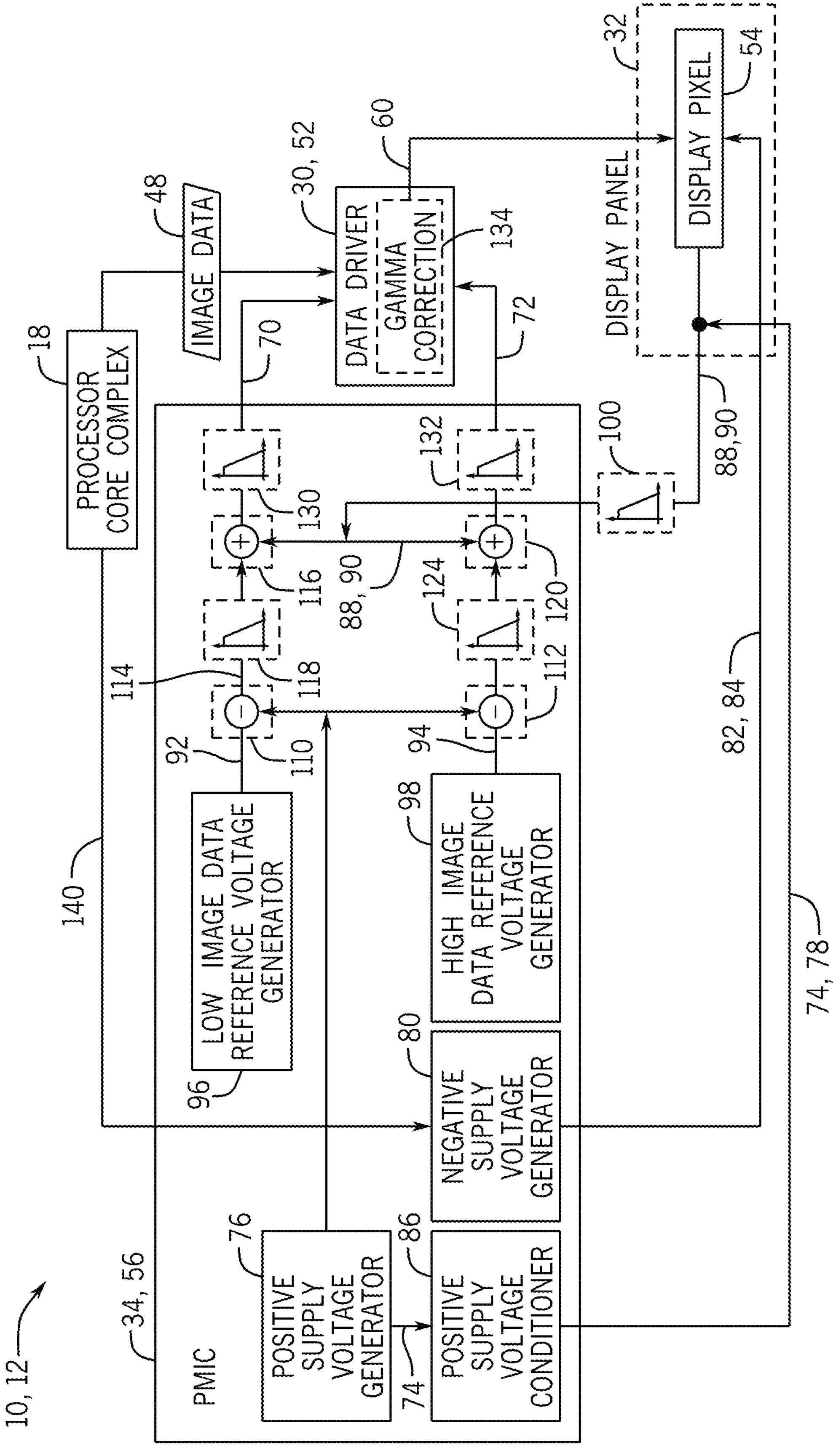
FIG. 8 is a block diagram of the electronic display of FIG. 7 having a normal operation mode and a current consumption throttle mode, according to embodiments of the present disclosure.

FIG. 8 is a block diagram of the portion of the electronic display 12 and/or electronic device 10 of FIG. 7 having a normal operation mode and a current consumption throttle mode, according to embodiments of the present disclosure. In some cases, the electronic display 12 may consume a reduced amount of current and/or power when operating in the current consumption throttle mode compared to operating in the normal operation mode. In some embodiments, the power source 26 of the electronic device 10, discussed above with respect to FIG. 1, may include a battery. For example, the current consumption throttle mode may increase a time before complete depletion of electrical charges stored in the battery based on reducing the current consumption and/or power consumption of the electronic display 12. It should be appreciated the reduced current consumption and/or power consumption of the electronic display 12 may correspond to a reduced current consumption and/or power consumption of the electronic device 10.

In the depicted embodiment, the processor core complex 18 may be coupled to the negative supply voltage generator 80 via a conductive path 140. The processor core complex 18 and/or any other viable electronic component and/or device may initiate and/or trigger the current consumption throttle mode. For example, the processor core complex 18 may generate and transmit one or more control signals (e.g., one or more throttle mode control signals) to the negative supply voltage generator 80 via the conductive path 140 to initiate the current consumption throttle mode. Alternatively or additionally, a sensor and/or any other viable electronic component and/or device may generate and transmit the control signals to the negative supply voltage generator 80 to initiate and/or trigger the current consumption throttle mode.

In some embodiments, the negative supply voltage generator 80 may generate the negative supply voltage 82 with multiple voltage values. For example, the negative supply voltage generator 80 may generate the negative supply voltage 82 with one or more elevated (e.g., increased) voltage values higher than a normal mode voltage value of the normal operation mode. The negative supply voltage generator 80 may generate the negative supply voltage 82 with the elevated voltage values to initiate or trigger the current consumption throttle mode in response to the control signals.

The elevated voltage values of the negative supply voltage 82 may reduce a differential voltage between the negative supply voltage 82 and the positive supply voltage 74. As mentioned above, the display pixel 54 may receive the negative supply voltage 82 and the positive supply voltage 74. Moreover, the display pixel 54 may consume an amount of current and/or power when emitting light in response to the programming voltages based on the differential voltage between the negative supply voltage 82 and the positive supply voltage 74. As such, the display pixel 54 may consume a reduced amount of current and/or power based on the reduced differential voltage in the current consumption throttle mode.

It should be appreciated that the negative supply voltage generator 80 and/or the PMIC 56 may output the negative supply voltage 82 with the elevated voltage values to a number of (e.g., all of) the display pixels 54 of the display panel 32. Accordingly, in some cases, the electronic display 12 may consume a reduced amount of current and/or power based at least in part on a reduced amount of current and/or power of the number of (e.g., all of) the display pixels 54 receiving the reduced differential voltage.

The processor core complex 18, the sensor, and/or the other viable electronic component and/or device may generate the control signals in response to one or more triggering event (e.g., one or more throttle mode triggering events). The triggering events may correspond to a low stored power (e.g., electrical power) at the power source 26 (e.g., the battery), a high power consumption of the electronic device 10, a high power consumption of the electronic display 12, or a combination thereof, among other things. In the embodiments described below, the processor core complex 18 may determine the triggering events and generate the control signals. It should be appreciated that in alternative or additional embodiments, any viable sensor and/or the electronic component and/or device may determine the triggering events and/or generate the control signals.

Figure 9:
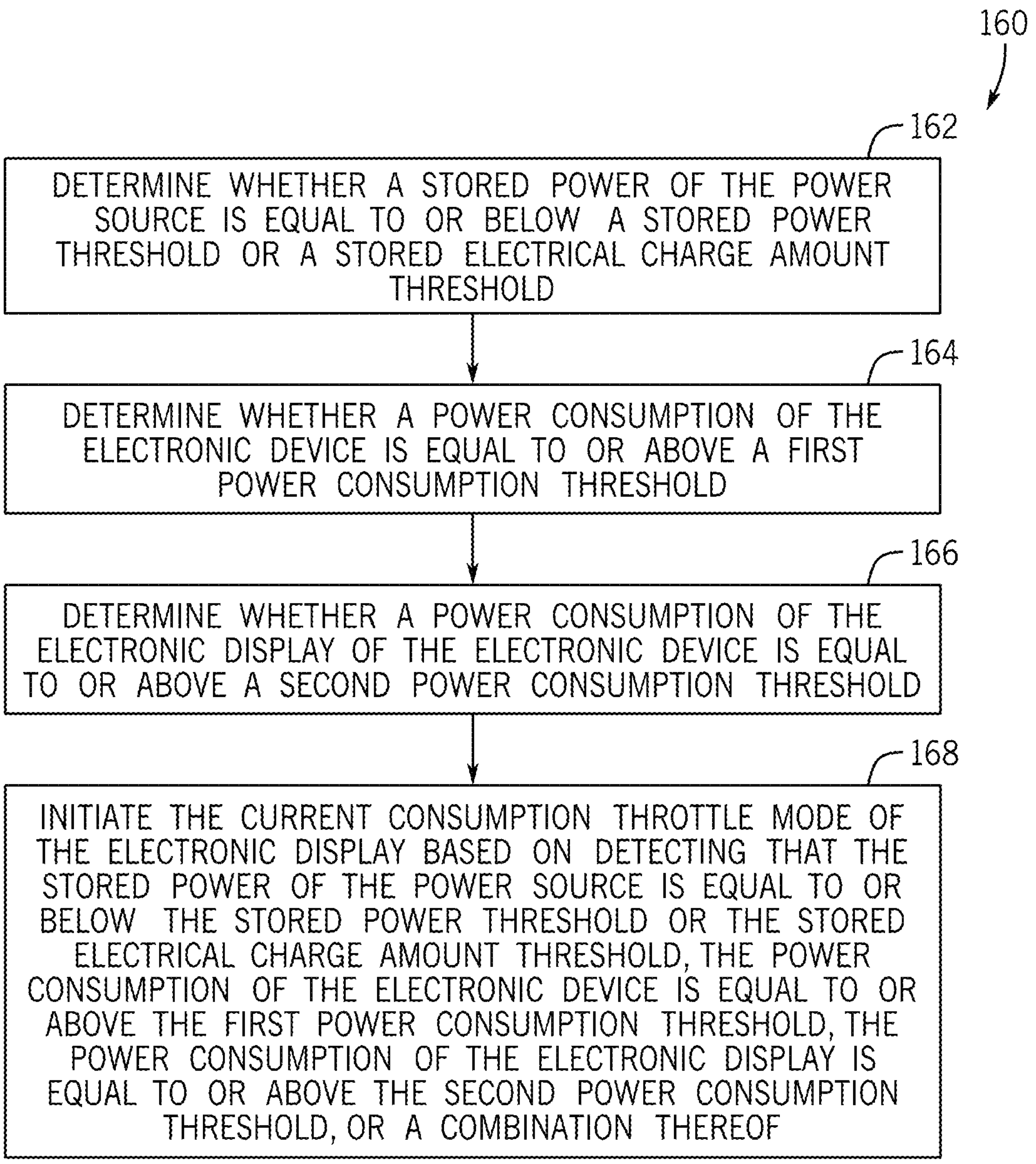
FIG. 9 is a flowchart of a method for the electronic device of FIG. 8 to initiate the current consumption throttle mode, according to embodiments of the present disclosure.

FIG. 9 is a flowchart of a method 160 for the electronic device 10 to initiate the current consumption throttle mode, according to embodiments of the present disclosure. Any suitable device (e.g., a controller) that may control components of the electronic device 10, such as the processor core complex 18, may perform the method 160. In some embodiments, the method 160 may be implemented by executing instructions stored in a tangible, non-transitory, computer-readable medium, such as the memory 20 or storage device 22, using the processor core complex 18. For example, the method 160 may be performed at least in part by one or more software components, such as an operating system of the electronic device 10, one or more software applications of the electronic device 10, and the like. While the method 160 is described using steps in a specific sequence, it should be understood that the present disclosure contemplates that the described steps may be performed in different sequences than the sequence illustrated, and certain described steps may be skipped or not performed altogether.

At process block 162, the processor core complex 18 may determine whether a stored power of the power source 26 is equal to or below a stored power threshold or a stored electrical charge amount threshold. For example, the electronic display 12 may be initially off, in a standby mode, operating in the normal operation mode, among other possibilities. The processor core complex 18 may determine a first triggering event in response to detecting that the stored power of the power source 26 is equal to or below the stored power threshold or the stored electrical charge amount threshold. For example, the stored electrical power threshold or the stored electrical charge amount threshold may correspond to a remaining capacity of 1 percent, 4 percent, 10 percent, 16 percent, 20 percent, and so on, and/or one tenth, one seventh, a quarter, or half, among other possibilities, of the battery of the power source 26.

At process block 164, the processor core complex 18 may determine whether a power consumption of the electronic device 10 is equal to or above a first power consumption threshold. The processor core complex 18 may determine a second triggering event in response to detecting that the power consumption of the electronic device 10 is equal to or above the first power consumption threshold. In some cases, the first power consumption threshold may correspond to a power consumption of 1 watt per hour, 6 watts per hour, 11 watts per hour, 63 watts per hour, 10 watt per hour, and so on. In alternative or additional cases, the first power consumption threshold may correspond to a current draw of 0.1 milli-ampere, 1 milli-ampere, 3 milli-amperes, 6 milli-amperes, 11 milli-amperes, and so on, from the power source 26.

For example, the electronic device 10 may perform one or multiple operations that individually or cumulatively consume power equal to or above the first power consumption threshold. In some cases, starting a new operation by the electronic device 10 automatically or based on a user input may increase the power consumption of the electronic device 10 equal to or above the first power consumption threshold. In such cases, the processor core complex 18 may determine the second triggering event in response to starting the new operation.

At process block 166, the processor core complex 18 may determine whether a power consumption of the electronic display 12 is equal to or above a second power consumption threshold. The processor core complex 18 may determine a third triggering event in response to detecting that the power consumption of the electronic display 12 is equal to or above the second power consumption threshold. In some cases, the second power consumption threshold may correspond to a power consumption of 0.1 watt per hour, 2 watts per hour, 5 watts per hour, 15 watts per hour, 35 watts per hour, and so on. In alternative or additional cases, the second power consumption threshold may correspond to a current draw of 0.01 milli-ampere, 0.1 milli-ampere, 0.8 milli-amperes, 2 milli-amperes, 10 milli-amperes, and so on, from the power source 26.

In yet alternative or additional cases, the second power consumption threshold may correspond to a display brightness threshold of the electronic display 12. For example, the display brightness threshold may correspond to 30%, 43%, 50%, 73%, 75%, 91%, and/or 100% or even above 100% during overdrive periods, among other percentage values, of a high (e.g., a defined maximum value, a maximum possible value) display brightness of the electronic display 12. In such cases, the processor core complex 18 may determine the third triggering event in response to increasing the display brightness of the electronic display 12 above the display brightness threshold.

At process block 168, the processor core complex 18 may initiate the current consumption throttle mode of the electronic display 12 based on detecting that the stored power of the power source 26 is equal to or below the stored power threshold or the stored electrical charge amount threshold, the power consumption of the electronic device 10 is equal to or above the first power consumption threshold, the power consumption of the electronic display 12 is equal to or above the second power consumption threshold, or a combination thereof. That is, the processor core complex 18 may generate the control signals based on one or more of the triggering events to initiate the current consumption throttle mode of the electronic display 12. In different embodiments, the processor core complex 18 may generate the control signals in response to the first triggering event, the second triggering event, the third triggering event, at least two of the triggering events, and/or all of the triggering events. For example, in some embodiments, the processor core complex 18 may generate the control signals in response to detecting a combination of the first triggering event, the second triggering event, and the third triggering event.

Moreover, it should be appreciated in alternative or additional embodiments, the processor core complex 18 may initiate the current consumption throttle mode of the electronic display 12 based on different triggering events. For example, a user may provide commands via the input devices 14 of the electronic device 10 discussed above to initiate the current consumption throttle mode.

Figure 10:
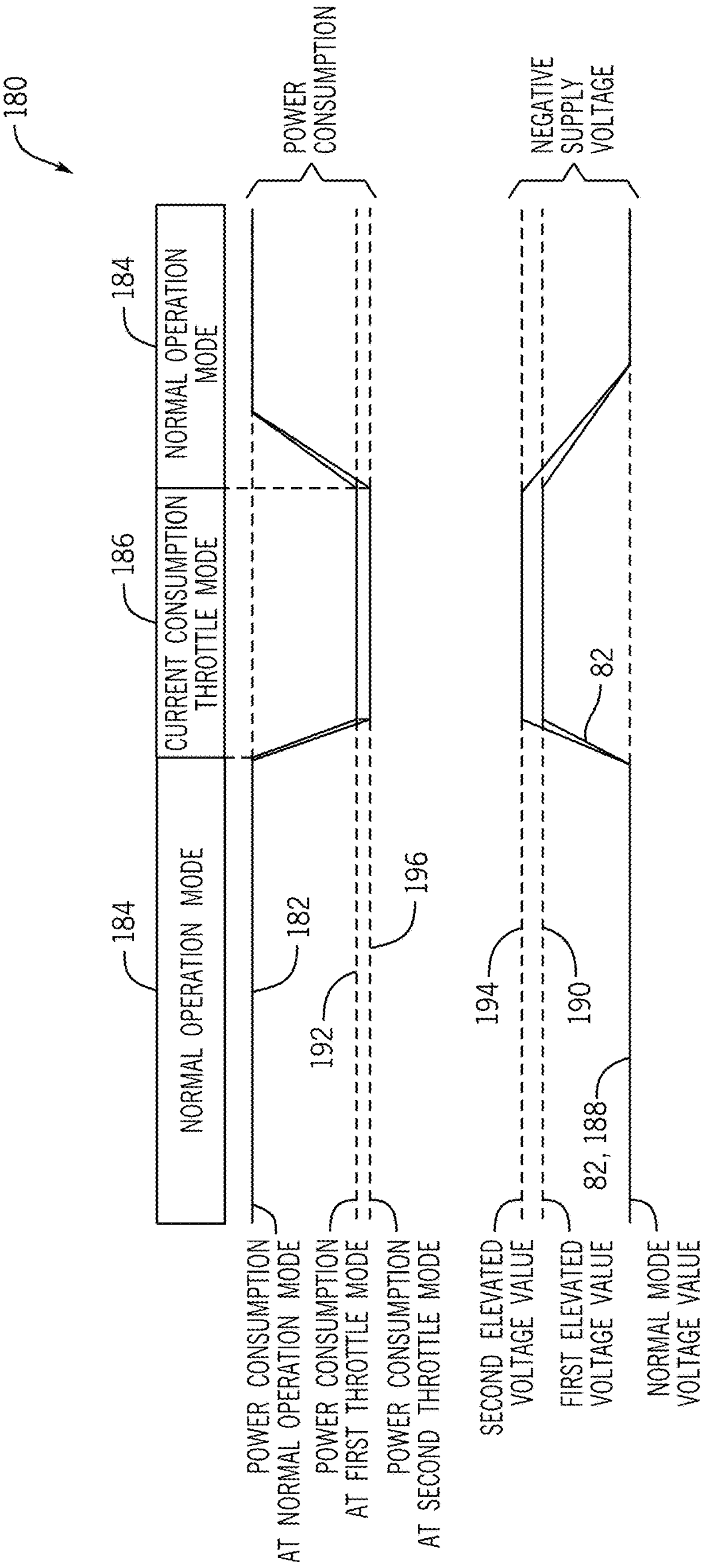
FIG. 10 is a graph illustrating a reduced power consumption of the electronic display of FIG. 8 when operating in the current consumption throttle mode compared to the normal operation mode, according to embodiments of the present disclosure.

FIG. 10 is a graph 180 illustrating a power consumption 182 of the electronic display 12 with respect to different voltage values of the negative supply voltage 82. The electronic display 12 may operate in a normal operation mode 184 and a current consumption throttle mode 186. In different embodiments, the current consumption throttle mode 186 may include a different number of underlying throttle modes each corresponding to generating the negative supply voltage 82 with a different voltage value. As mentioned above, the negative supply voltage generator 80 may generate the negative supply voltage 82 with multiple voltage values. The negative supply voltage generator 80 may generate one or more elevated (e.g., increased) voltage values higher than a normal mode voltage value 188 of the normal operation mode 184 associated with the current consumption throttle mode 186.

The negative supply voltage generator 80 may generate the negative supply voltage 82 with a normal mode voltage value 188 when operating in the normal operation mode 184. The electronic display 12 may have a first power consumption 182 based on the negative supply voltage 82 having the normal mode voltage value 188 at the normal operation mode 184. In the depicted embodiment, the current consumption throttle mode 186 may include a first throttle mode and a second throttle mode.

The negative supply voltage generator 80 may generate the negative supply voltage 82 with a first elevated voltage value 190 (e.g., a first throttle mode voltage value) higher than the normal mode voltage value 188 when operating in the first throttle mode. The negative supply voltage generator 80 may output the first elevated voltage value 190 in response to receiving the control signals indicative of operation in the first throttle mode. In the depicted embodiment, the electronic display 12 may have a first reduced power consumption 192 based on the negative supply voltage 82 having the first elevated voltage value 190. For example, a current flow of the positive supply voltage 74 and the negative supply voltage 82 through the display pixels 54 in response to a programing voltage may be reduced. Accordingly, the display pixel 54 may emit light with reduced brightness based on the reduced current draw and/or power consumption of the display pixels 54.

The negative supply voltage generator 80 may generate the negative supply voltage 82 with a second elevated voltage value 194 (e.g., a second throttle mode voltage value) higher than the first elevated voltage value 190 when operating in the second throttle mode. The negative supply voltage generator 80 may output the second elevated voltage value 194 in response to receiving the control signals indicative of operation in the second throttle mode. In the depicted embodiment, the electronic display 12 may have a second reduced power consumption 196 based on the negative supply voltage 82 having the second elevated voltage value 194.

For example, a current flow of the positive supply voltage 74 and the negative supply voltage 82 through the display pixels 54 in response to a programming voltage may be further reduced compared to when operating in the first throttle mode. In some cases, the display pixel 54 may emit light with further reduced brightness compared to when operating in the first throttle mode. Although a first throttle mode and a second throttled mode is discussed here, it should be appreciated that in alternative or additional embodiments, the current consumption throttle mode 186 may include a different number of underlying throttle modes.

Figure 11:
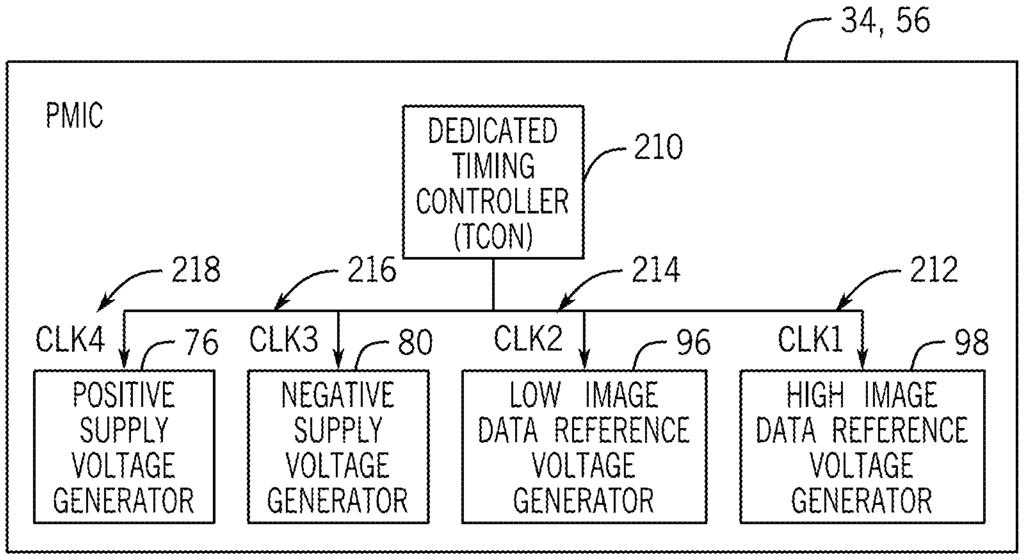
FIG. 11 is a block diagram of a portion of the PMIC of the power supply circuitry including a dedicated timing controller (TCON), according to embodiments of the present disclosure.

FIG. 11 is a block diagram of a portion of the PMIC 56 of the power supply circuitry 34 including a dedicated timing controller (TCON) 210, according to embodiments of the present disclosure. Although the dedicated timing controller 210 is depicted inside the PMIC 56 in the depicted embodiment, in alternative or additional embodiments, the dedicated timing controller 210 may also be disposed outside of the PMIC 56. In any case, one or more output terminals of the dedicated timing controller 210 may be coupled to a number of voltage generator circuits (e.g., switching converters) of the PMIC 56. The dedicated timing controller 210 may generate and provide one or more clock signals with a desired oscillation frequency to one or more of the voltage generator circuits (e.g., the switching converters) of the PMIC 56 via respective output terminals. For example, the dedicated timing controller 210 may include one or more crystal oscillators to generate and provide one or more clock signals. In specific embodiments, the output terminals of the dedicated timing controller 210 may not be coupled to any circuit component outside the PMIC 56.

In the depicted embodiment, the dedicated timing controller 210 may be coupled to the high voltage generator 98, the low voltage generator 96, the negative supply voltage generator 80, and the positive supply voltage generator 76. It should be appreciated that in alternative or additional embodiments, the dedicated timing controller 210 may be coupled to a different number and/or combination of circuits and/or components of the PMIC 56. Moreover, the dedicated timing controller 210 may generate a first clock signal 212, a second clock signal 214, a third clock signal 216, and a fourth clock signal 218.

In alternative or additional embodiments, the dedicated timing controller 210 may generate one, two, or three of the clock signals 212, 214, 216, and 218 and/or additional clock signals. For example, the dedicated timing controller 210 may provide either of the clock signals 212, 214, 216, or 218 and/or the additional clock signals to one, two, or more circuits and/or components disposed in the PMIC 56. In specific embodiments, the dedicated timing controller 210 may not provide the generated clock signals, such as the clock signals 212, 214, 216, or 218 and/or the additional clock signals to circuits, components, and/or devices outside the PMIC 56.

The dedicated timing controller 210 may output the first clock signal 212 to the high voltage generator 98, the second clock signal 214 to the low voltage generator 96, the third clock signal 216 to the negative supply voltage generator 80, and the fourth clock signal 218 to the positive supply voltage generator 76. In some embodiments, the first clock signal 212, the second clock signal 214, the third clock signal 216, and/or the fourth clock signal 218 may each have an oscillation frequency within a desired clock frequency range. For example, the first clock signal 212, the second clock signal 214, the third clock signal 216, and/or the fourth clock signal 218 may each have a similar or different oscillation frequency within the desired clock frequency range.

In some cases, the dedicated timing controller 210 may provide the clock signals 212, 214, 216, and 218 with improved frequency accuracy to the circuits and/or components of (e.g., disposed in) the PMIC 56. The improved frequency accuracy may be with respect to one or more other clock signals of other timing controllers of the electronic display 12 and/or the electronic device 10. The other timing controllers may be disposed outside of the PMIC 56 or not be dedicated to circuits and/or components of the PMIC 56.

For examples, generating clock signals locally on the PMIC 56 or dedicated to one or more circuits and/or components of the PMIC 56 may improve a frequency variation or tighten a frequency range of the clock signals 212, 214, 216, and/or 218. As such, in the depicted embodiment, the high voltage generator 98, the low voltage generator 96, the negative supply voltage generator 80, and/or the positive supply voltage generator 76 may generate the respective output signals with improved voltage and/or with reduced frequency variation.

In some embodiments, each of the high voltage generator 98, the low voltage generator 96, the negative supply voltage generator 80, and the positive supply voltage generator 76 may generate the respective output signals with an oscillation frequency equal to or near the oscillation frequency of the respective clock signals. In some cases, the improved voltage and/or frequency precision of the clock signals 212, 214, 216, and/or 218 may reduce a frequency range of undesired harmonic signals of the output signals of one or more of the voltage generators 76, 80, 96, and/or 98. As such, voltage generators 76, 78, 96, and/or 98 may generate the respective output signals with an oscillation frequency within the desired clock frequency range. Accordingly, the output signals of one or more of the voltage generators 76, 78, 96, and/or 98 may appear less in a visible frequency range of the display pixels 54. It should be appreciated that in some cases, the output signals of one or more of the voltage generators 76, 78, 96, and/or 98 may not appear in the visible frequency range of the display pixels 54.

Figure 12:
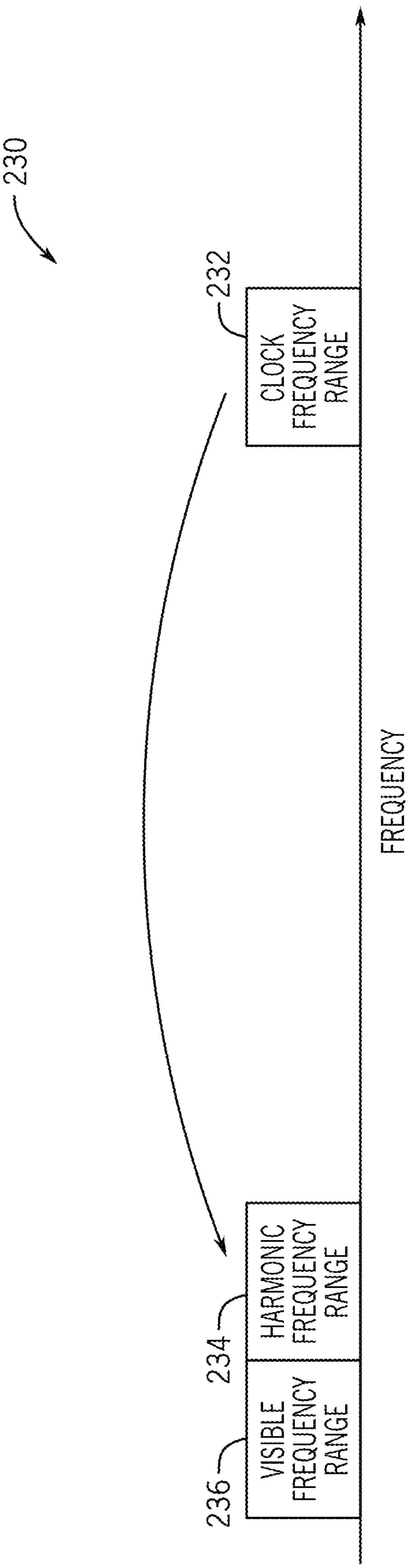
FIG. 12 is a graph illustrating a clock signal frequency range of the dedicated timing controller of FIG. 11, a harmonic frequency range of the switching frequency range, and a visible frequency range associated with the visible light spectrum based on including the dedicated timing controller, according to embodiments of the present disclosure.

FIG. 12 is a graph 230 illustrating a clock frequency range 232 of the dedicated timing controller 210 (e.g., the desired clock frequency range), a harmonic frequency range 234 of the clock frequency range 232, and a visible frequency range 236, according to embodiments of the present disclosure. In some cases, the visible frequency range 236 may correspond to or otherwise be associated with the visible light spectrum. For example, the visible frequency range 236 may correspond to at least a portion of frequency ranges 0-20 kilohertz (KHz), 10-200 KHz, 200-240 KHz, 150-420 KHz, 420-460 KHz, and so on. As mentioned above, in some embodiments, the first clock signal 212, the second clock signal 214, the third clock signal 216, and/or the fourth clock signal 218 may each have an oscillation frequency within the clock frequency range 232.

As mentioned above, the dedicated timing controller 210 may provide the clock signals 212, 214, 216, and 218 with improved frequency accuracy to the circuits and/or components of (e.g., disposed in) the PMIC 56. In the depicted graph, at least some harmonic signals of the output signals of one or more of the voltage generators 76, 78, 96, and/or 98 may have an oscillation frequency within the harmonic frequency range 234 and outside the visible frequency range 236. In some cases, such harmonic signals may have an oscillation frequency outside of the visible frequency range 236 based on the improved frequency accuracy of the clock signals 212, 214, 216, and 218. Accordingly, at least in some cases, including the dedicated timing controller 210 with the electronic display 12 may reduce visible front of screen artifacts.

Figure 13:
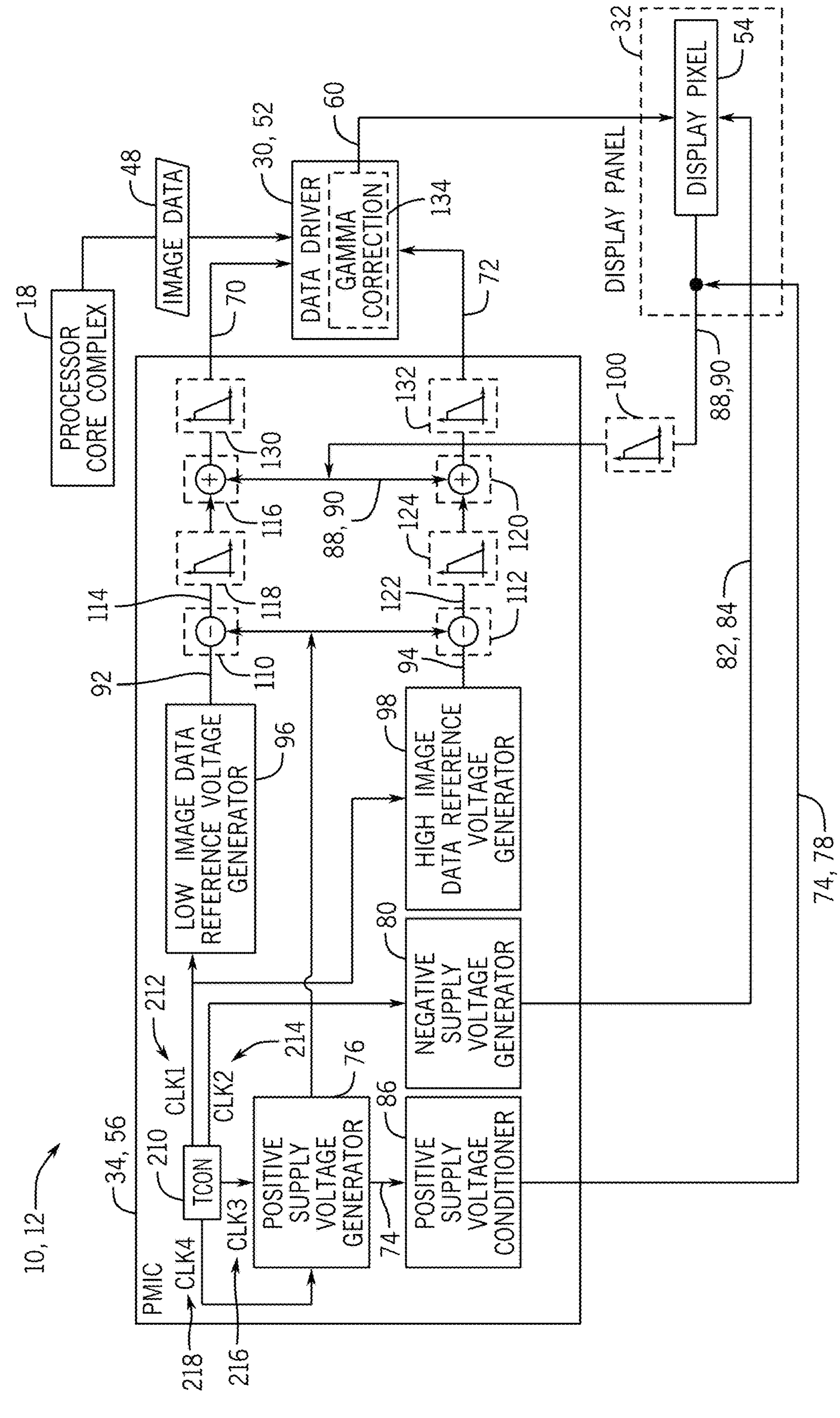
FIG. 13 is a block diagram of a portion of the electronic display including at least a portion of the PMIC of FIG. 11 that includes the dedicated timing controller, according to embodiments of the present disclosure.

FIG. 13 is a block diagram of a portion of the electronic display 12 including at least a portion of the PMIC 56 including the dedicated timing controller 210 of FIG. 11, according to embodiments of the present disclosure. The portion of the electronic display 12 may also include the display pixel 54 and the portion of the data driver 52 discussed above with respect to FIGS. 7 and 8. In the depicted embodiment, the processor core complex 18 of the electronic device 10 may output the image data 48 to the data driver 52. In alternative or additional embodiments, the image data 48 may be received from another electronic device 10, for example, via the network interface 24, the input devices 14, and/or the I/O port 16 of the electronic device 10 discussed above. The data driver 52 may generate and transmit one or more programming voltages based on the image data 48 to the display pixel 54 for emitting light with a desired gray level. In some cases, the data driver 52 may generate the one or more programming voltages based on the image data 48 and as adjusted based on the adjusted reference voltages 70 and 72, to compensate for the undesired DC voltage offset and/or AC noise at the display pixel 54.

For example, the negative supply voltage generator 80 and the positive supply voltage generator 76 (e.g., the switching converters) may receive the first clock signal 212 and the second clock signal 214 having an oscillating frequency within the improved (e.g., tightened, reduced) clock frequency range 232. As such, the negative supply voltage generator 80 and the positive supply voltage generator 76 may generate and provide the negative supply voltage 82 and the positive supply voltage 74, respectively, with an oscillating frequency within the improved (e.g., tightened, reduced) clock frequency range 232 discussed above. Similarly, the low voltage generator 96 and the high voltage generator 98 (e.g., the switching converters) may receive the first clock signal 212 and the second clock signal 214 having an oscillating frequency within the improved clock frequency range 232. The low voltage generator 96 and the high voltage generator 98 may generate and provide the low reference voltage 92 and the high reference voltage 94, respectively, with an oscillating frequency within the improved clock frequency range 232 discussed above.

Figure 14:
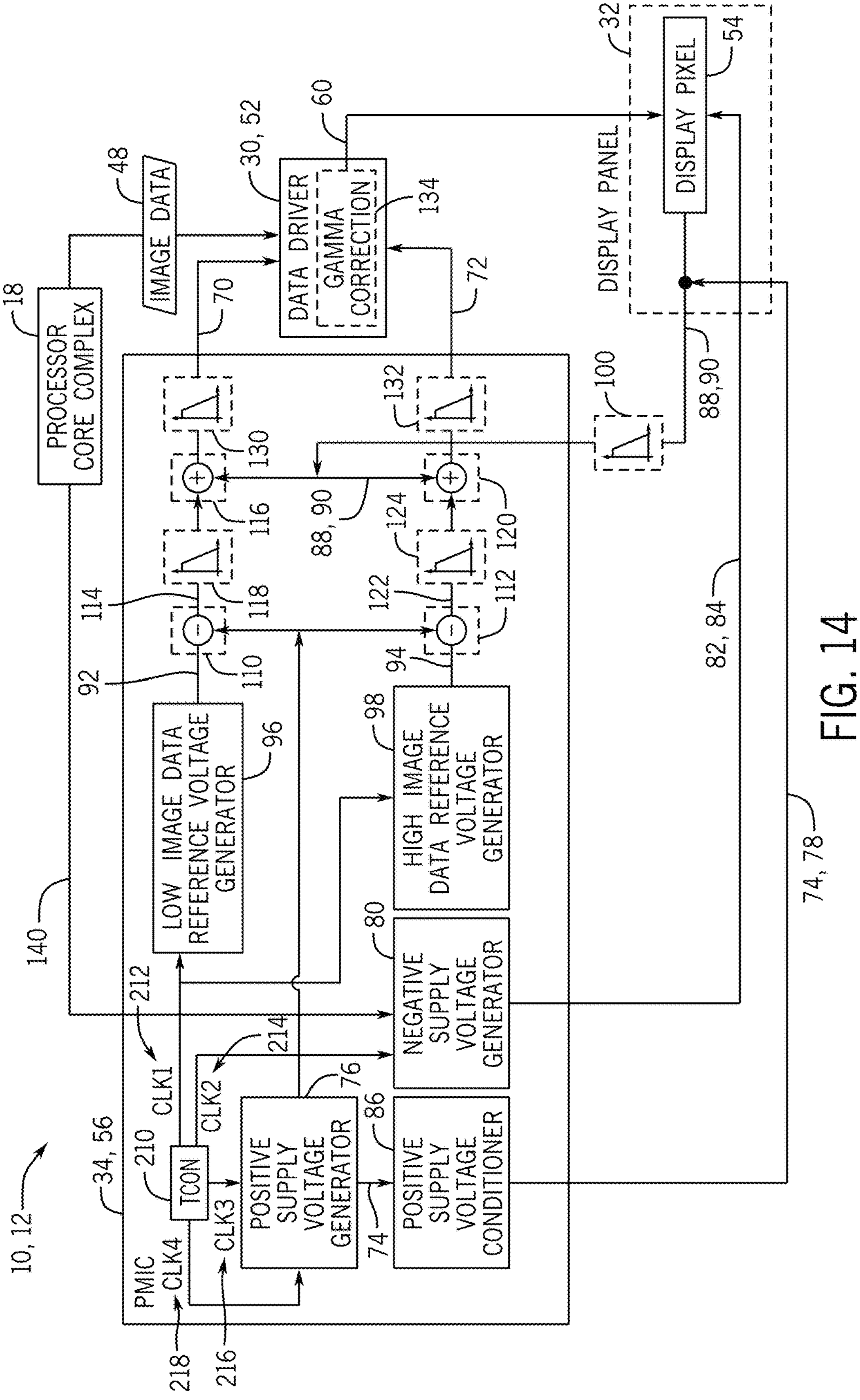
FIG. 14 is a block diagram of the portion of the electronic display of FIG. 7 including at least a portion of the PMIC, the dedicated timing controller of FIGS. 11-13, and having the current consumption throttle mode of FIGS. 8-10, according to embodiments of the present disclosure.

FIG. 14 is a block diagram of a portion of the electronic display 12 including at least a portion of the PMIC 56 including the dedicated timing controller 210 and having the current consumption throttle mode, according to embodiments of the present disclosure. The dedicated timing controller 210 is described above with respect to FIGS. 11-12 associated with the electronic display 12 of FIGS. 1-6. The current consumption throttle mode is described above with respect to FIGS. 8-10 associated with the electronic display 12 of FIGS. 1-6. Moreover, in some cases, the display pixel 54 of FIG. 14 may emit light with reduced front of screen artifacts based on receiving programming voltages based on the image data 48 and as adjusted based on the adjusted reference voltages 70 and 72, to compensate for the undesired DC voltage offset and/or AC noise at the display pixel 54, as discussed above with respect to FIGS. 6 and 7 associated with the electronic display 12 of FIGS. 1-6.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:
a display panel;
a power management integrated circuit coupled to the display panel, the power management integrated circuit configured to:
output a positive supply voltage to the display panel;
receive an indication of an undesired direct current (DC) voltage offset, an undesired alternating current (AC) noise, or both from the display panel in response to the positive supply voltage; and
output an adjusted low voltage and an adjusted high voltage adjusted based on the undesired DC voltage offset, the undesired AC noise, or both; and
a data driver coupled to the display panel and the power management integrated circuit, wherein the data driver is configured to:

generate a programming voltage based on image data, the adjusted low voltage, and the adjusted high voltage; and output the programming voltage to the display panel.

2. The electronic device of claim 1, wherein the power management integrated circuit comprises a negative supply voltage generator configured to generate a negative supply voltage with a normal mode voltage value, a first elevated voltage value associated with reducing a power consumption of the electronic device, and a second elevated voltage value associated with further reducing the power consumption of the electronic device.

3. The electronic device of claim 2, comprising a processor core complex coupled to the negative supply voltage generator, wherein the processor core complex outputs control signals to the negative supply voltage generator indicative of generating the first elevated voltage value or the second elevated voltage value in response to a stored power of a power source of the electronic device being equal to or below a stored power threshold or a stored electrical charge amount threshold, a power consumption of the electronic device being equal to or above a first power consumption threshold, a power consumption of the display panel, the power management integrated circuit, the data driver, or a combination thereof being equal to or above a second power consumption threshold, or a combination thereof.

4. The electronic device of claim 1, comprising:

a first resistor-capacitor filter coupled to the data driver, wherein the first resistor-capacitor filter is configured to adjust a frequency range of the adjusted low voltage; and a second resistor-capacitor filter coupled to the data driver, wherein the second resistor-capacitor filter is configured to adjust a frequency range of the adjusted high voltage.

5. The electronic device of claim 1, comprising a dedicated timing controller coupled to the power management integrated circuit, wherein the dedicated timing controller is configured to output one or more clock signals only to one or more components of the power management integrated circuit.

6. The electronic device of claim 5, wherein the dedicated timing controller is configured to generate the one or more clock signals having an oscillation frequency within a clock frequency range, wherein a harmonic signal of the one or more clock signals is outside a visible frequency range based on the oscillation frequency of the one or more clock signals being within the clock frequency range.

7. An electronic display comprising:

a plurality of display pixels;

a power management integrated circuit coupled to at least one display pixel of the plurality of display pixels, the power management integrated circuit configured to:

output a positive supply voltage to the at least one display pixel;

receive a sensed positive supply voltage from the at least one display pixel, wherein the sensed positive supply voltage comprises the positive supply voltage and an undesired direct current (DC) voltage offset, an undesired alternating current (AC) noise, or both;

generate an adjusted low voltage based on a low reference voltage, the positive supply voltage, and the sensed positive supply voltage; and generate an adjusted high voltage based on a high reference voltage, the positive supply voltage, and the sensed positive supply voltage; and a data driver coupled to the plurality of display pixels and the power management integrated circuit, the data driver configured to:

generate a programming voltage based on image data, the adjusted low voltage, and the adjusted high voltage; and output the programming voltage to the at least one display pixel.

8. The electronic display of claim 7, wherein the power management integrated circuit comprises:

a low reference voltage generator configured to generate the low reference voltage;

a high reference voltage generator configured to generate the high reference voltage; and a positive supply voltage generator configured to generate the positive supply voltage.

9. The electronic display of claim 8, wherein the power management integrated circuit comprises a dedicated timing controller, wherein the dedicated timing controller is coupled to at least one of the low reference voltage generator, the high reference voltage generator, the positive supply voltage generator, and a negative supply voltage generator, and wherein the dedicated timing controller is configured to generate at least one clock signal.

10. The electronic display of claim 9, wherein the at least one clock signal has an oscillation frequency within a clock frequency range, wherein a harmonic signal of the clock signal is outside a visible frequency range based on the oscillation frequency of the at least one clock signal being within the clock frequency range.

11. The electronic display of claim 8, wherein the power management integrated circuit comprises:

a first subtraction circuit coupled to the positive supply voltage generator and the low reference voltage generator, wherein the first subtraction circuit is configured to generate a low delta reference voltage based on subtracting the positive supply voltage from the low reference voltage;

a first adder circuit coupled to the first subtraction circuit and the data driver, wherein the first adder circuit is configured to generate the adjusted low voltage based on adding the low delta reference voltage and the sensed positive supply voltage;

a second subtraction circuit coupled to the positive supply voltage generator and the high reference voltage generator, wherein the second subtraction circuit is configured to generate a high delta reference voltage based on subtracting the positive supply voltage from the high reference voltage; and a second adder circuit coupled to the second subtraction circuit and the data driver, wherein the second adder circuit is configured to generate the adjusted high voltage based on adding the high delta reference voltage and the sensed positive supply voltage.

12. The electronic display of claim 7, wherein the data driver comprises gamma correction circuitry configured to generate the programming voltage, and wherein the data driver is configured to output the programming voltage to the at least one display pixel to emit light with a gray level based on the image data and compensate for the undesired DC voltage offset, the undesired AC noise, or both at the at least one display pixel based on the adjusted low voltage and the adjusted high voltage.

13. The electronic display of claim 7, wherein:

the low reference voltage corresponds to a voltage value to emit light with a gray level associated with black color and the high reference voltage corresponds to a voltage value to emit light with a gray level associated with white color; or the low reference voltage corresponds to a voltage value to emit light with a gray level associated with white color and the high reference voltage corresponds to a voltage value to emit light with a gray level associated with black color.

14. The electronic display of claim 7, wherein the power management integrated circuit is configured to generate the adjusted low voltage and the adjusted high voltage based on tuning the low reference voltage and the high reference voltage, respectively, in proportion to, in inverse proportion to, or by scaling with respect to the undesired DC voltage offset, the undesired AC noise, or both.

15. The electronic display of claim 7, wherein the power management integrated circuit comprises a negative supply voltage generator configured to generate a negative supply voltage with a normal mode voltage value, a first elevated voltage value higher than the normal mode voltage value, and a second elevated voltage value higher than the first elevated voltage value.

16. An electronic device comprising:

a processor core complex configured to output image data indicative of a gray level;

an electronic display comprising:

a display panel;

a power management integrated circuit coupled to the display panel, the power management integrated circuit configured to:

output a positive supply voltage to the display panel;

receive an indication of an undesired direct current (DC) voltage offset, an undesired alternating current (AC) noise, or both from the display panel in response to the positive supply voltage; and output an adjusted low voltage and an adjusted high voltage based on the undesired DC voltage offset, the undesired AC noise, or both; and a data driver coupled to the display panel and the processor core complex, the data driver configured to:

receive the image data from the processor core complex;

generate a programming voltage based on the image data, the adjusted low voltage, and the adjusted high voltage; and output the programming voltage to the display panel.

17. The electronic device of claim 16, wherein the display panel comprises a plurality of display pixels, wherein at least one display pixel of the plurality of display pixels is configured to emit light with the gray level of the image data based on the programming voltage.

18. The electronic device of claim 16, wherein the power management integrated circuit comprises:

a low reference voltage generator configured to generate the low reference voltage;

a high reference voltage generator configured to generate the high reference voltage;

a positive supply voltage generator configured to generate the positive supply voltage;

a first subtraction circuit coupled to the positive supply voltage generator and the low reference voltage generator, wherein the first subtraction circuit is configured to generate a low delta reference voltage based on subtracting the positive supply voltage from the low reference voltage;

a first adder circuit coupled to the first subtraction circuit and the data driver, wherein the first adder circuit is configured to generate the adjusted low voltage based on adding the low delta reference voltage and a sensed positive supply voltage comprising the indication of the undesired DC voltage offset, the undesired AC noise, or both;

a second subtraction circuit coupled to the positive supply voltage generator and the high reference voltage generator, wherein the second subtraction circuit is configured to generate a high delta reference voltage based on subtracting the positive supply voltage from the high reference voltage; and a second adder circuit coupled to the second subtraction circuit and the data driver, wherein the second adder circuit is configured to generate the adjusted high voltage based on adding the high delta reference voltage and the sensed positive supply voltage.

19. The electronic device of claim 16, comprising a dedicated timing controller coupled to the power management integrated circuit, wherein the dedicated timing controller is configured to output one or more clock signals only to one or more components of the power management integrated circuit.

20. The electronic device of claim 16, wherein the power management integrated circuit comprises a negative supply voltage generator configured to generate a negative supply voltage with a normal mode voltage value, a first elevated voltage value higher than the normal mode voltage value, and a second elevated voltage value higher than the first elevated voltage value.

* * * * *